United States Patent
Du et al.

(10) Patent No.: US 9,971,818 B2
(45) Date of Patent: May 15, 2018

(54) INTEGRATING DATA BETWEEN DIFFERENT ENTERPRISE SYSTEMS

(71) Applicant: INTERNATIONAL BUSINESS MACHINES CORPORATION, Armonk, NY (US)

(72) Inventors: Bing Bing Du, Beijing (CN); Qian Li Jin, Beijing (CN); Ma Jirong, Beijing (CN); Kai Lin Li, Beijing (CN); Wu Wei, Beijing (CN); Wei Guo Xing, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 622 days.

(21) Appl. No.: 14/306,608

(22) Filed: Jun. 17, 2014

(65) Prior Publication Data
US 2015/0006556 A1    Jan. 1, 2015

(30) Foreign Application Priority Data

Jun. 26, 2013 (CN) .......................... 2013 1 0258262

(51) Int. Cl.
G06F 17/30 (2006.01)
(52) U.S. Cl.
CPC ................................ *G06F 17/3056* (2013.01)
(58) Field of Classification Search
None
See application file for complete search history.

(56) References Cited

U.S. PATENT DOCUMENTS

| 2002/0113821 A1 | 8/2002 | Hrebejk et al. |
| 2003/0074636 A1 | 4/2003 | Manepalli |

(Continued)

FOREIGN PATENT DOCUMENTS

| CN | 1619495 A | 5/2005 |
| CN | 1713140 A | 12/2005 |

(Continued)

OTHER PUBLICATIONS

Boulet, Magali, Implementing Hybrid Cloud Integration with IBM WebSphere Cast Iron and IBM SmartCloud Enterprise, IBM developerWorks, Aug. 29, 2012.

(Continued)

*Primary Examiner* — Anh Tai Tran
(74) *Attorney, Agent, or Firm* — Yudell Isidore PLLC (57) ABSTRACT

The present disclosure relates to a method, system, and computer program product for integrating data between a plurality of different enterprise systems. An illustrative embodiment of the disclosure provides a method for integrating data between different systems, comprising: acquiring a user interface metadata for each of a plurality of enterprise systems, wherein the user interface metadata of an enterprise system corresponds to data in the same enterprise system and describes how the data should be presented on a user interface of the enterprise system; in response to acquiring the user interface metadata for each of the plurality of enterprise systems, generating a user interface presentation for each of the plurality of enterprise systems according to the user interface metadata; and establishing, for each of the plurality of enterprise systems, a first mapping between the user interface presentation and a structure of the data.

12 Claims, 5 Drawing Sheets

(56) References Cited

U.S. PATENT DOCUMENTS

| | | |
|---|---|---|
| 2004/0268234 A1 | 12/2004 | Sampathkumar et al. |
| 2006/0200749 A1* | 9/2006 | Shenfield .................. G06F 8/38 715/239 |
| 2009/0006992 A1* | 1/2009 | Gilboa ...................... G06F 8/38 715/763 |
| 2009/0094364 A1 | 4/2009 | Stevens et al. |
| 2009/0182703 A1 | 7/2009 | Nachimuthu et al. |
| 2011/0119603 A1 | 5/2011 | Peltz et al. |
| 2012/0324069 A1 | 12/2012 | Nori et al. |

FOREIGN PATENT DOCUMENTS

| | | |
|---|---|---|
| CN | 101393517 A | 3/2009 |
| CN | 101676910 B | 3/2010 |
| WO | WO2005114393 A | 12/2005 |

OTHER PUBLICATIONS

Jinsong, Jiang et al., "Generic GUI Generator Based on XML and XSD", Journal of Computer Research and Development, Nov. 29, 2009.

Ning, Jing et al., "Novel Approach for Extracting XML Schema Definition Based in Content Model Graph", Computer Science, Jul. 15, 2009.

State Intellectual Property Office, Chinese Application No. 201310258262.3, Office Action, dated Feb. 3, 2017.

\* cited by examiner

Name: ☐

Gender: ○ male  ○ female

Birthday: [1980 ▾] year [1 ▾] month [1 ▾] day

Fig. 3B

Name: ☐

Gender: ◉ male  ○ female

Birthday: [19800101]

INTEGRATING DATA BETWEEN DIFFERENT ENTERPRISE SYSTEMS

The present application claims benefit of priority from China Patent Application 201310258262.3, filed on Jun. 26, 2013. The content of that application is incorporated by reference herein.

BACKGROUND

1. Technical Field

The present disclosure relates to data processing. More specifically, the present disclosure relates to a method, system, and computer program product for integrating data between differing enterprise systems.

2. Description of the Related Art

Currently, there are various approaches for reducing difficulty in data integration between different systems. Most data integration tools have enterprise metadata discovery mechanisms that to map enterprise data into an XML format for presentation in a tree structure. These tools traditionally require a user perform data mapping between data of such tree structures, including dragging lines between associated data fields and writing logic processing methods. Furthermore, the integration approaches of the prior art require an integration developer individually read a great number of documents of each enterprise system in order to understand meanings of each field in enterprise data of each enterprise system so that the integration developer may establish a field mapping relationship between the different systems. This is a time consuming and error prone process.

BRIEF SUMMARY

Disclosed is a method, system, and computer program product for integrating data between different enterprise systems. In a first aspect of the present disclosure there is provide a method, comprising: acquiring user interface metadata corresponding to data of each enterprise system. The user interface metadata describes how to data of each enterprise system should be presented on a user interface of that enterprise system. The method further comprises generating a user interface presentation corresponding to each enterprise system according to the respective user interface metadata of that enterprise system, and establishing, for each enterprise system, a mapping between the user interface presentation of each enterprise system and a structure of data.

According to another aspect of the present disclosure, there is provided a system for integrating data between different systems. The system comprises a first acquiring module that acquires user interface metadata corresponding to data of each enterprise. The user interface metadata describes how to data of each enterprise system should be presented on a user interface of that enterprise system. The system further comprises: a first generating module that generates a user interface presentation corresponding to each enterprise system according to the respective user interface metadata of that enterprise system; and an establishing module that configured to establishes, for each enterprise system, a mapping between the user interface presentation of each enterprise system and a structure of data.

BRIEF DESCRIPTION OF THE DRAWINGS

The present disclosure can be better understood by referring to the following description when read in conjunction with the accompanying drawings, in which same or similar reference numerals are used to denote same or similar components. The drawings, together with the following detailed description, are included in the specification and form part thereof, and used to further illustrate by way of example preferred embodiments of the present disclosure and explain principles and advantages of the present disclosure.

DETAILED DESCRIPTION OF AN ILLUSTRATIVE EMBODIMENT

Described herein is a method, system, and computer program product for integrating data between enterprise different systems. According to the illustrative embodiments provided herein, intuitive data integration may be achieved on a user interface of the system, such that the time spent by a developer learning or identifying field mapping relationships between different systems is significantly reduced. Although an illustrative implementation of one or more embodiments is provided below, the disclosed systems and/or methods may be implemented using any number of techniques. The present disclosure is not limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon for performing the various functions of the present disclosure. It will be understood by those skilled in the art that the apparatus that embodies a part or all of the present disclosure may be a general purpose device having at least one processing unit, a memory, and a software executing on the at least one processing unit that is further configured to provide a part or all of an embodiment of the disclosure.

Aspects of the present disclosure are described below with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, to implement the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 1:
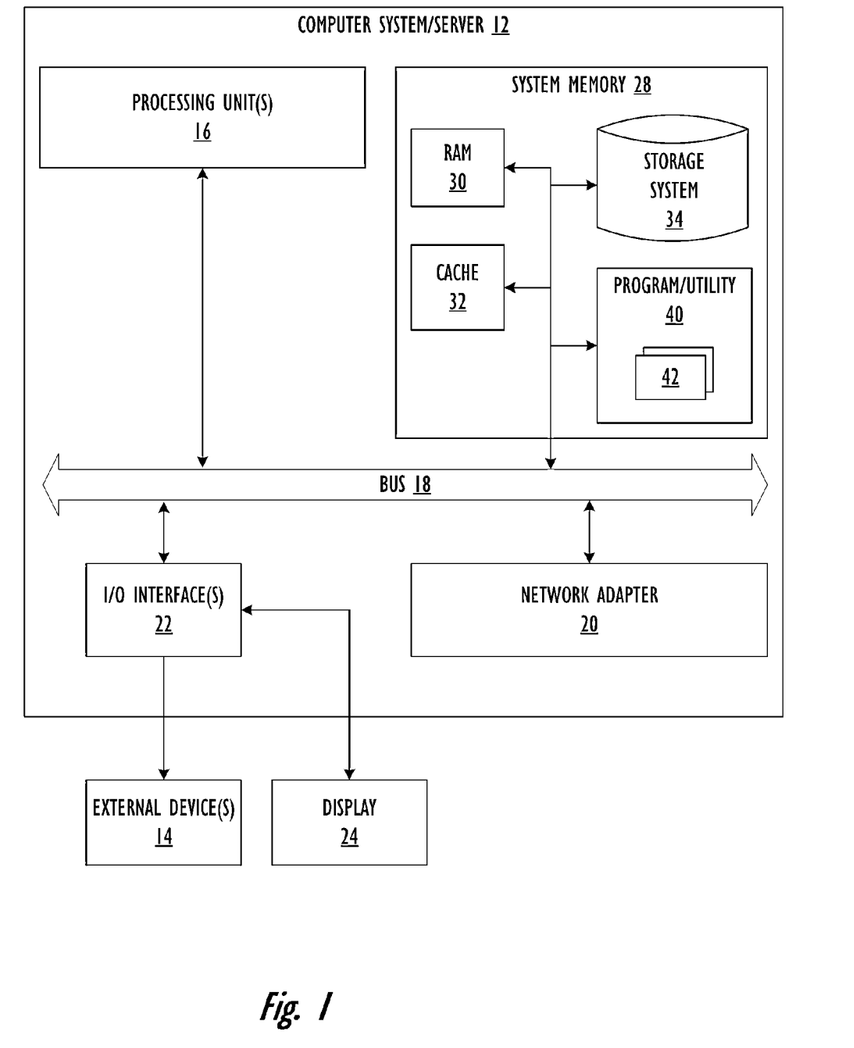
FIG. 1 is a block diagram of an exemplary computer system/server according to an embodiment of the present disclosure.

With reference now to FIG. 1, there is depicted an exemplary computer system/server for implementing the embodiments of the present disclosure. Computer system/server 12 is only illustrative and is not intended to suggest any limitation as to the scope of use or functionality of embodiments of the disclosure described herein.

As shown in FIG. 1, computer system/server 12 is shown in the form of a general-purpose computing device. The components of computer system/server 12 may include, but are not limited to, processing unit 16, system memory 28, and bus 18 which couples various system components, including system memory 28, to processor 16. In another embodiment, processing unit 16 may include multiple processors or processing units. Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and includes both volatile and non-volatile media, removable media, and non-removable media. System memory 28 can include computer readable media in the form of volatile memory, such as random access memory (RAM) 30, and/or cache memory 32. Computer system/server 12 may further include other removable/non-removable, volatile/non-volatile computer system storage media. Computer system/server 12 may further include storage system 34 for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media may also be provided. In such instances, each can be connected to bus 18 by one or more data media interfaces. As will be further depicted and described below, system memory 28 may include at least one program product having a set (e.g., at least one) of program modules that are configured to carry out the functions of embodiments of the present disclosure. Program/utility 40 comprises a set (at least one) of program modules 42 that may be stored in system memory 28. Program/utility 40 may also include an operating system(s), one or more application programs, other program modules, and program data, each of which may include an implementation of a networking environment. In one embodiment, program modules 42 may carry out the functions and/or methodologies of the present disclosure as described herein.

Computer system/server 12 may also communicate with a display 24, one or more external devices 14 such as a keyboard, a pointing device, one or more devices that enable a user to interact with computer system/server 12, and/or any devices that enable computer system/server 12 to communicate with one or more other computing devices (e.g., a network card or a modem) via Input/Output (I/O) interfaces 22. Further still, computer system/server 12 may communicate with one or more networks such as a local area network (LAN), a general wide area network (WAN), and/or a public network (e.g., the Internet) via network adapter 20. As depicted, network adapter 20 communicates with the other components of computer system/server 12 via bus 18. In one embodiment computer system/server 12 may also include other components such as: microcode, device drivers, redundant processing units, external disk drive arrays, redundant array of inexpensive disks (RAID) systems, tape drives, and data archival storage systems, etc.

In addition the computer system/server 12, as shown in FIG. 1, may also be embodied within, and/or coupled to, one or more mobile electronic devices, including but not limited to, mobile telephones, personal data assistants (PDAs), and tablet computers. Typically, these mobile electronic devices also include at least one touch input device, including but not limited to, a touch screen or a touch tablet.

Figure 2:
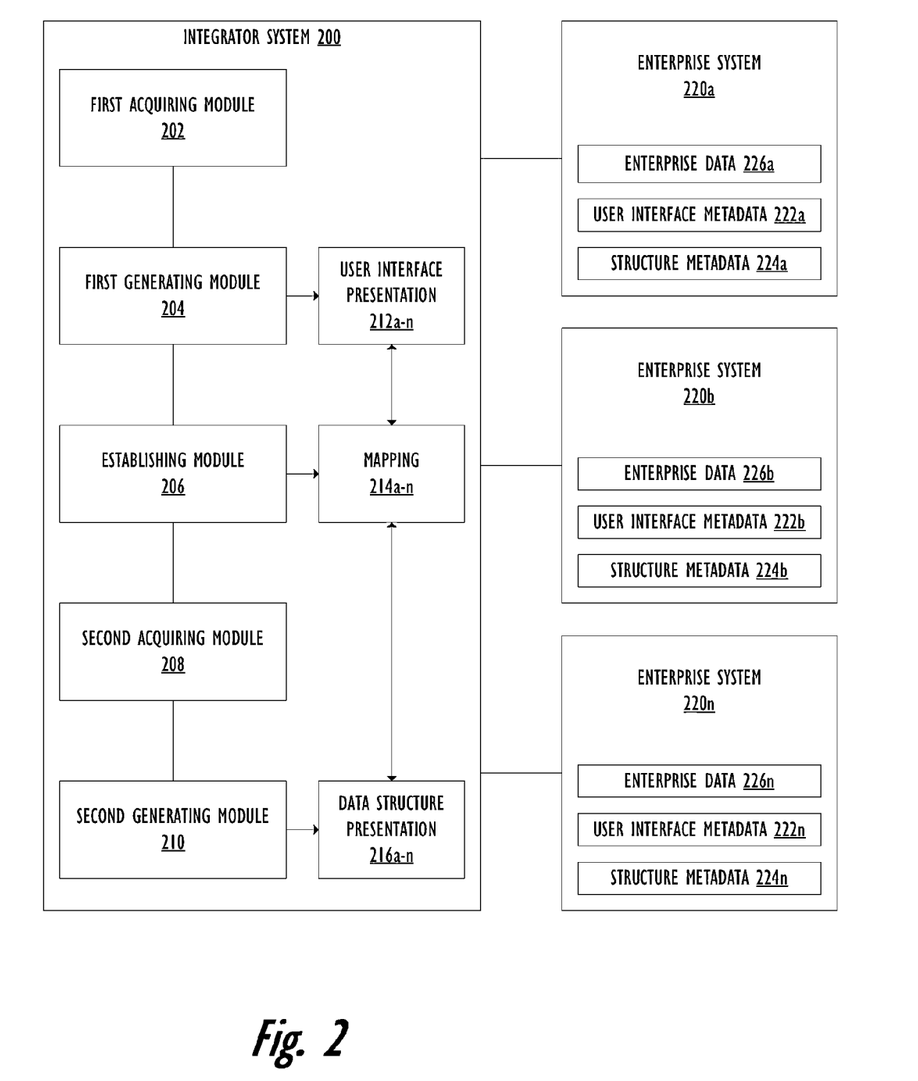
FIG. 2 is a block diagram of an integrator system for integrating data between different enterprise systems according to an embodiment of the disclosure.

With reference now to FIG. 2, there is illustrated a block diagram of an integrator system 200 for integrating data between a plurality of different enterprise systems 220*a-n* according to an embodiment of the disclosure. According to an embodiment of the disclosure, integrator system 200 comprises: a first acquiring module 202, a first generating module 204, an establishing module 206, a second acquiring module 208, and a second generating module 210. Integrator system 200 comprises and/or is communicatively coupled to the plurality of enterprise systems 220*a-n*.

First acquiring module 202 of integrator system 200 is configured to acquire user interface metadata 222*a* of enterprise data 226*a-n* corresponding to each enterprise system. The user interface metadata 222*a-n* of a particular enterprise system 220*a-n* describes how the enterprise data 226*a-n* should be presented on a user interface of that particular enterprise system 220*a-n*. First generating module 204 of integrator system 200 is configured to generate a user interface presentation 212*a-n* for each respective enterprise system 220*a-n* according to each corresponding user interface metadata 222*a-n*. Establishing module 206 is configured to establish a mapping 214a-n between each user interface presentation 212a-n and a structure of the enterprise data 226a-n.

User interface metadata 222a-n may be stored in form of XML code, or in any other forms known in the art. Those skilled in the art may select any form to store user interface metadata 222a-n as needed. An example user interface metadata 222a-n in the XML code form is given below. It should be understood that, the following description is provided for illustrative purposes only and should not be construed as a limitation of the present disclosure. Additionally, while the below example provides an example of user interface metadata of two enterprise systems, it should be understood that the present disclosure is applicable to three or more enterprise systems, and accordingly to three or more corresponding sets of user interface metadata.

In this example it is assumed that there are two different enterprise systems—systems A and B. For system A, the user interface metadata of data $UI_A$ is stored in a file account.layout.xml, and its content is as follows.

```
<layout id="account" name="account">
  <element name="C_name" type="text" label="Name:"/>
  <element name="C_gen" type="radiobutton" label="Gender:">
    <input type="radio" name="radiobutton" value="true" label="male" />
    <input type="radio" name="radiobutton" value="false" label="female"/>
  </element>
  <element name="C_bd" type="complex" label="Birthday:">
    <select name=" bd_y" label="year">
      <option value="1980">1980</option>
        <option value="1981">1981</option>
        <option value="1982">1982</option>
        ................
    </select>
    <select name="bd_m" label="month">
        <option value="1">1</option>
        <option value="2">2</option>
        <option value="3">3</option>
        ................
    </select>
    <select name="bd_d" label="day">
        <option value="1">1</option>
        <option value="2">2</option>
        <option value="3">3</option>
        ............
    </select>
  </element>
</layout>
```

For system B, the user interface metadata of data $UI_B$ is stored in a file user.layout.xml, and its content is as follows.

```
<layout id="user" name="user">
  <element name="username" type="text" label="Name:"/>
  <element name="usergender" type="radiobutton" label="Gender:">
    <input type="radio" name="radiobutton" value="true" label="male" />
    <input type="radio" name="radiobutton" value="false" label="female"
/>
    </element>
  <element>
  <element name="userbirthday" type="text" label="Birthday:"/>
</layout>
```

Figure 3A:
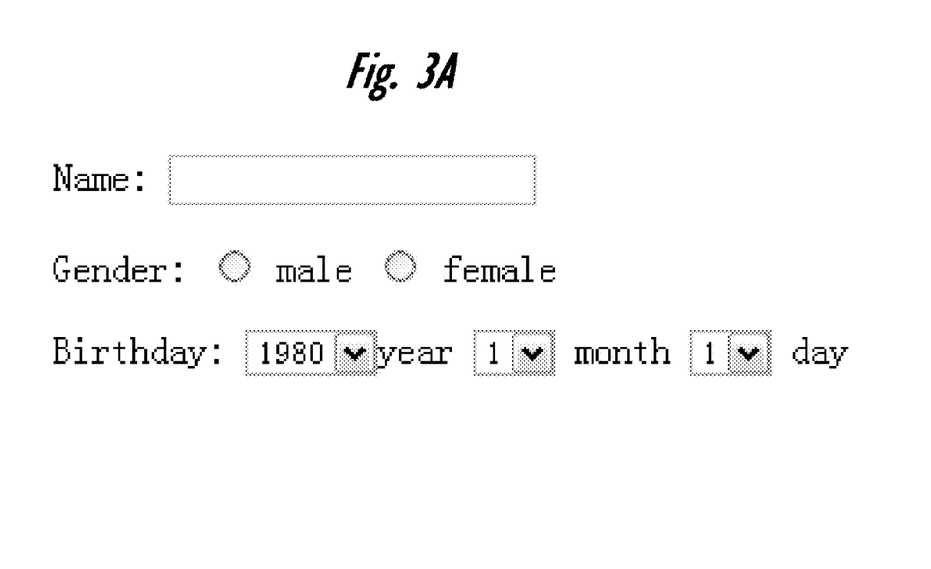
FIGS. 3A-B illustrates exemplary user interface presentations generated from user interface metadata according to an embodiment of the present disclosure

Each user interface presentation 212a-n may include any number of user interface units, such as: text input boxes, radio buttons, check boxes, and drop-down selection boxes. The user interface presentations 212a-n corresponding to each enterprise system 220a-n may be generated by reading and executing user interface metadata of data. For example, using the above example user interface metadata $UI_A$ for system A, by reading and executing user interface metadata $UI_A$ of data, the following can be acquired: (1) User interface element C_name: its type being "text", its label being "Name", (2) User interface element C_gen: its type being "radiobutton", its label being "Gender", and (3) User interface element C_bd: its type being "complex", its label being "Birthday", and having three sub-elements with type being "select". In this example, a user interface element corresponding to type "text" is a text input box, user interface unit corresponding to type "radiobutton" is a radio button, and user interface unit corresponding to type "select" is a drop-down select box. The user interface presentation corresponding to the above data of system A is illustrated in FIG. 3A.

Figure 3B:
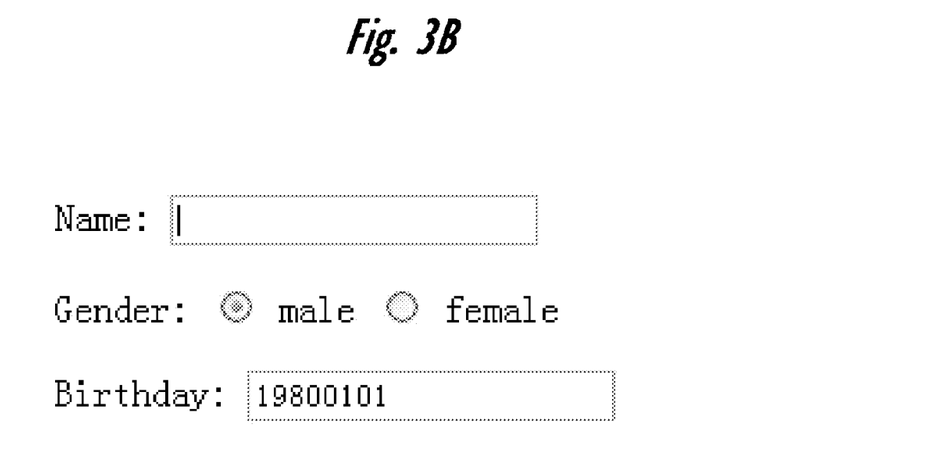

Similarly, using the above user interface metadata $UI_B$ of system B, for example, by reading and executing user interface metadata $UI_B$, the following can be acquired: (1) User interface element username: its type being "text", its label being "Name", (2) User interface element usergender: its type being "radiobutton", its label being "Gender", and (3) User interface element userbirthday: its type being "text", its label being "Birthday". In this example, the user interface unit corresponding to type "text" is a text input box, and user interface being corresponding to type "radiobutton" is a radio button. User interface presentation corresponding to the above data of system B is illustrated in FIG. 3B. It should be understood that, the above example are provided only for the purpose of illustration and should not be construed as a limitation of the present disclosure.

Mapping 214a-n between user interface presentations 212a-n and a structure of the associated enterprise data 226a-n of each enterprise system 220a-n may be established by correlating user interface metadata 222a-n with the structure of enterprise data 226a-n. According to an embodiment of the disclosure, user interface metadata 222a-n and the structure of enterprise data 226a-n may be correlated via an element name, in order to establish the mapping 214a-n.

Using the above systems A and B as an example again, assuming that the structure of data is in an XML format, as for system A, data structure $DS_A$ of data is stored in a file account.xsd, and its content is as follows.

```
<schema xmlns="http://www.w3.org/2001/XMLSchema"
    targetNamespace="http://www.example.org/NewXMLSchema"
    xmlns:tns="http://www.example.org/NewXMLSchema"
    elementFormDefault="qualified">
    <complexType name="Account">
        <sequence>
            <element name="C_name" type="string"></element>
            <element name="C_gen" type="string"></element>
            <element name="C_bd"
type="tns:BirthdayType"></element>
        </sequence>
    </complexType>
    <element name="Account" type="tns:Account"></element>
    <complexType name="BirthdayType">
        <sequence>
            <element name="bd_y" type="int"></element>
            <element name="bd_m" type="int"></element>
            <element name="bd_d" type="int"></element>
        </sequence>
    </complexType>
</schema>
```

As for system B, data structure $DS_B$ of data is stored in a file user.xsd, and its content is as follows.

```
<schema xmlns="http://www.w3.org/2001/XMLSchema"
   targetNamespace="http://www.example.org/NewXMLSchema"
   xmlns:tns="http://www.example.org/NewXMLSchema"
   elementFormDefault="qualified">
   <complexType name="User">
      <sequence>
         <element name="username" type="string"></element>
         <element name="usergender" type="string"></element>
         <element name="userbirthday" type="string"></element>
      </sequence>
   </complexType>
   <element name="User" type="tns:User"></element>
</schema>
```

Thus, it can be seen that for system A, user interface metadata $UT_A$ and structure $DS_A$ of data may be correlated via element names "C_name", "C_Gen", and "C_bd", so as to establish a mapping between the user interface presentation of system A and the structure of data. Similarly, as for system B, the mapping between the user interface presentation of system B and the structure of data may be established by correlating user interface metadata $UI_B$ of data and the structure $DS_B$ of data via element names.

According to an embodiment of the disclosure, integrator system 200 may further comprise a second acquiring module 208 and a second generating module 210. Second acquiring module 208 is configured to acquire structure metadata 224a-n corresponding to the enterprise data 226a-n of each enterprise system 220a-n. Structure metadata 224a-n describes a structure of a corresponding data enterprise data 226a-n. Second generating module 210 is configured to generate data structure presentation 216a-n corresponding to the respective structure metadata 224a-n of each enterprise system 220a-n.

According to an embodiment of the disclosure, establishing module 206 is further configured to establish a mapping 214a-n between the user interface presentation 212a-n and the data structure presentation 216a-n of each enterprise system 220a-n. In one embodiment of the disclosure, the data structure presentation 216a-n is a tree.

According to an embodiment of the disclosure, integrator system 200 may further comprises a receiving module (not shown) that is configured to receive user input which establishes correlation between data elements on a user interface presentation 212a-n corresponding to each enterprise system 220a-n. The receiving module may also be coupled with a correlation module (not shown) that is configured to establish a correlation between data elements on the data structure presentation 216a-n corresponding to each enterprise system 220a-n according to the mapping 214a-n between user interface presentation 212a-n and data structure presentation 216a-n of each enterprise system 220a-n.

According to an embodiment of the disclosure, a receiving module (not shown) may be configured to receive user input that establishes a correlation between data elements within the enterprise data 226a-n and the data structure presentation 216a-n for each enterprise system 220a-n. A correlation module (not shown) of integrator system 200 may also be configured to establish a correlation between data elements on user interface presentation 212a-n corresponding to each enterprise system 220a-n according to the mapping 214a-n between the user interface presentation 212a-n and the data structure presentation 216a-n for each enterprise system 220a-n.

Figure 4:
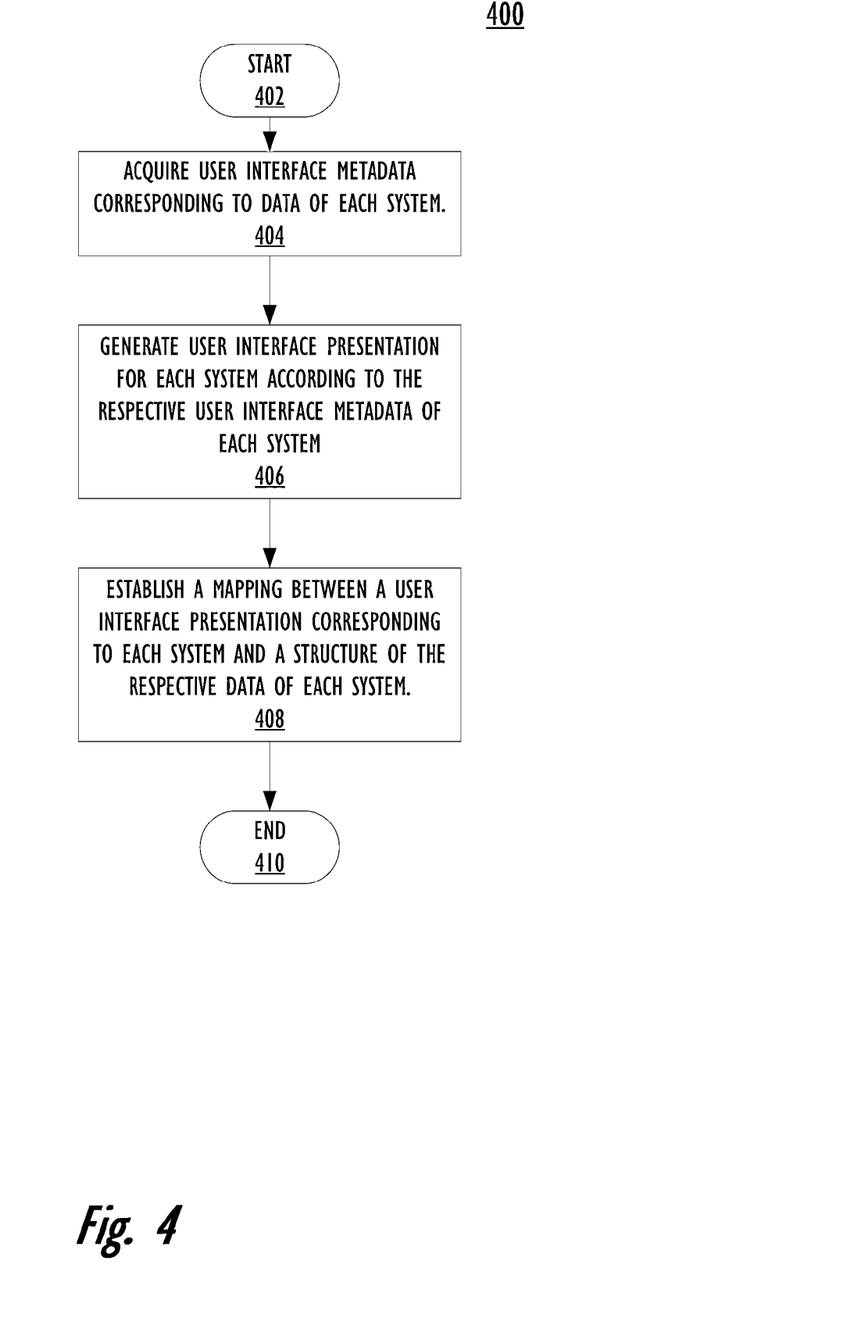
FIG. 4 is a flow diagram of a method for integrating data between different systems according to an embodiment of the present disclosure.

With reference now to FIG. 4, there is depicted a flowchart of a method for integrating data between different enterprise systems according to an embodiment of the disclosure. Method 400 starts at step 402. At step 404 user interface metadata corresponding to each enterprise system is acquired. Next, method 400 proceeds to step 406 where a user interface presentation corresponding to each enterprise system is generated according to the user interface metadata of each respective enterprise system. At step 408 a mapping between a user interface presentation corresponding to each system and a respective structure of a data is established. Method 400 then terminates at step 410.

Figure 5:
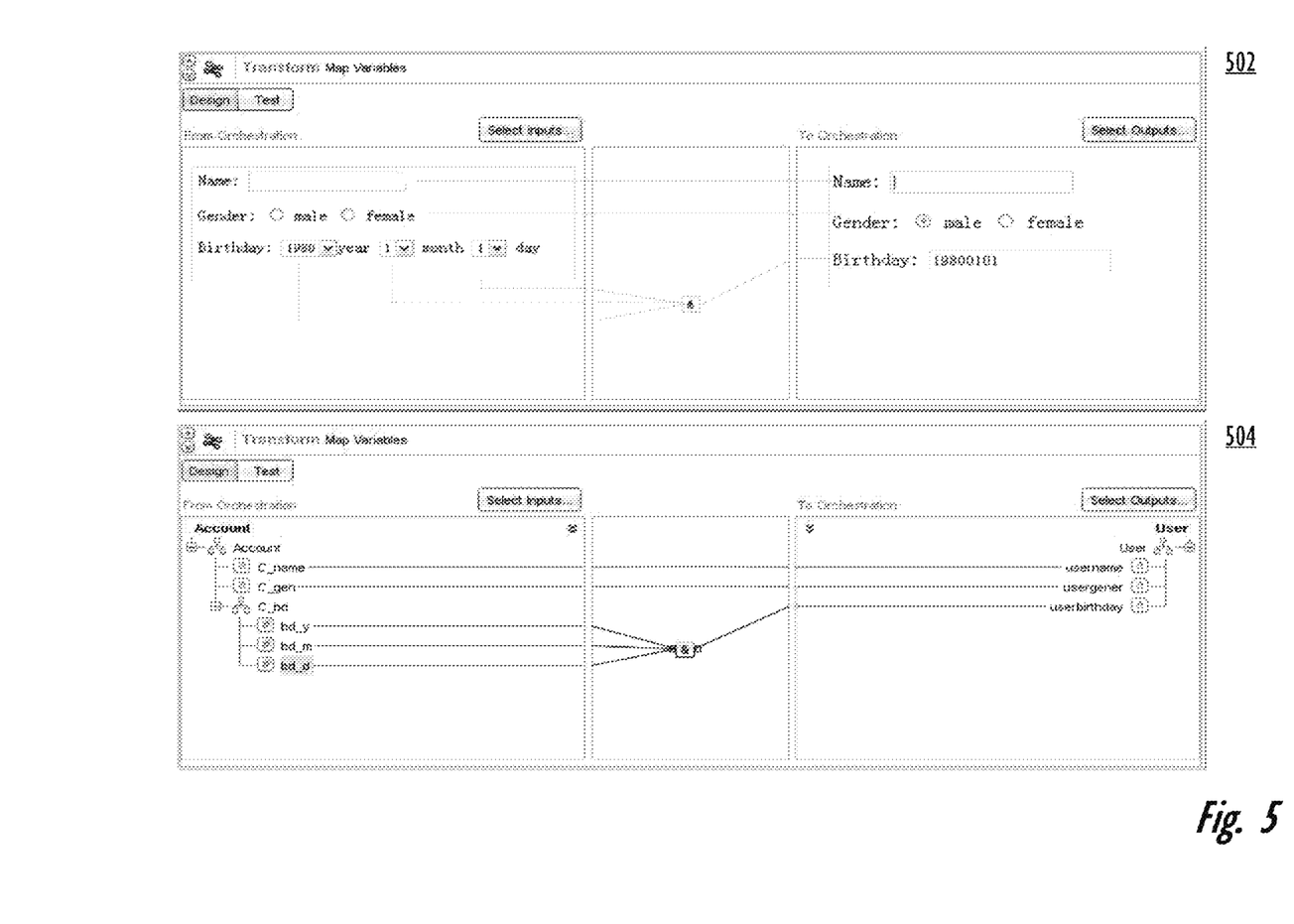
FIG. 5 is an exemplary diagram of a result generated from establishing correlation between data elements on a structure presentation and a user interface presentation corresponding to each system according to the mapping between the user interface presentation and the data structure presentation corresponding to each system, according to an embodiment of the present disclosure.

With reference now to FIG. 5, there is illustrated an example schematic diagram which portrays a first correlation view 502 and a second correlation view 504 according to the mapping between user interface presentation and data structure presentation, and in accordance with an embodiment of the disclosure. First correlation view 502 illustrates a correlation between data elements on a user interface presentation. Second correlation view 504 illustrates a correlation between data elements on a data structure presentation. First correlation view 502 and a second correlation view 504 are the result of establishing correlation between data elements on (a) the data structure presentation corresponding to each enterprise system according to the mapping between a user interface presentation and (b) data structure presentation corresponding to each system or establishing correlation between data elements on user interface presentation that corresponds to each system, according to the mapping between the user interface presentation and (c) the data structure presentation corresponding to each enterprise system in response to receiving user input for establishing correlation between data elements on the user interface presentation that corresponds to each enterprise system or establishing correlation between data elements on the data structure presentation corresponding to each system.

According to an embodiment of the disclosure, the method for integrating data between different enterprise systems further comprises: acquiring structure metadata corresponding to each system, and generating a data structure presentation corresponding to each system according to the structure metadata of that respective enterprise system. The structure metadata may further be used to describe the structure of the data.

According to an embodiment of the disclosure, the step of establishing a mapping between a user interface presentation corresponding to each system and a respective structure of data further comprises establishing a mapping between a user interface presentation and a data structure presentation of each respective system. According to an embodiment of the disclosure, the data structure presentation is a tree.

According to an embodiment of the disclosure, the method for integrating data between different systems further comprises: receiving a user input which establishes correlation between data elements of the enterprise data on the user interface presentation corresponding to each system; and establishing a correlation between data elements on the data structure presentation of each system according to the mapping between the user interface presentation and the data structure presentation corresponding to each system.

According to an embodiment of the disclosure, the method for integrating data between different systems further comprises: receiving a user input which establishes a correlation between data elements of the enterprise data on a data structure presentation corresponding to each system; and establishing a correlation between data elements on a user interface presentation corresponding to each system according to the mapping between the user interface presentation and the data structure presentation corresponding to each system.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions in the flowcharts may occur out of the order noted in the figures. For example, two blocks shown in succession may, in fact, be executed substantially concurrently, or the blocks may sometimes be executed in the reverse order, depending upon the specific functionality and implementation involved. It should also be noted that each block in the block diagrams and/or flowcharts and a combination of blocks in the block diagrams and/or flowcharts may be implemented by a dedicated hardware-based system for performing specified functions or operations or by a combination of dedicated hardware and computer instructions.

These computer program instructions may also be stored in any combination of one or more computer usable or computer readable medium(s) that are capable of directing a computer or other programmable data processing apparatus to function in a particular manner, such that the instructions stored in the computer usable or computer readable medium(s) produce an article of manufacture including instruction means which implement the functions/acts specified in the flowcharts and/or block diagrams described herein. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for integrating data of each of a plurality of different enterprise systems, comprising:
   an integrator system acquiring, for each of a plurality of enterprise systems that are communicatively coupled to the integrator system, user interface metadata that describes how enterprise data within a corresponding enterprise system should be presented on a user interface of that enterprise system, wherein the enterprise data of each of the plurality of enterprise systems comprises a plurality of data elements;
   in response to acquiring the user interface metadata for each of the plurality of enterprise systems, generating, for display on each of the plurality of enterprise systems, a user interface presentation according to each corresponding user interface metadata;
   acquiring, for each of the plurality of enterprise systems, a structure metadata that describes a structure of the enterprise data of that enterprise system;
   generating, for each of the plurality of enterprise systems, a data structure presentation according to the structure metadata;
   establishing, for each of the plurality of enterprise systems, a first mapping between the user interface presentation and the structure of the enterprise data;
   establishing, for each of the plurality of enterprise systems, a second mapping between the user interface presentation and the data structure presentation;
   receiving, from an input device of at least one enterprise system, a user input which establishes, on a particular user interface presentation of the at least one enterprise system, a correlation between a first group of data elements from among the plurality of data elements;
   establishing, based on the received correlation between the first group of data elements on the particular user interface presentation, a correlation between the first group of data elements within a corresponding data structure presentation of the at least one enterprise system according to the second mapping; and presenting, on an output device of the at least one enterprise system:
- a first correlation view that depicts the received correlation between the first group of data elements within the particular user interface presentation; and
- a second correlation view that depicts the received correlation between the first group of data elements within the corresponding data structure presentation.

2. The method according to claim 1, wherein the data structure presentation is a tree.

3. The method according to claim 1, further comprising:
receiving, from an input device of the at least one enterprise system, a user input which establishes, on a particular data structure presentation of the at least one enterprise system, a correlation between a second group of data elements from among the plurality of data elements; and establishing, based on the received correlation between the second group of data elements, a correlation between the second group of data elements within a corresponding user interface presentation of the at least one enterprise system according to the second mapping.

4. The method according to claim 3, further comprising:
presenting, on the output device of the at least one enterprise system:
- a third correlation view that depicts the received correlation between the second group of data elements within the particular data structure presentation; and
- a fourth correlation view that depicts the received correlation between the second group of data elements within the corresponding user interface presentation.

5. A system comprising:
a plurality of enterprise systems;
an integrator system communicatively coupled to the plurality of enterprise systems, the integrator system having a processor, at least one input device, and a system memory having stored therein a plurality of modules that when executed by the processor cause the processor to:
acquire a user interface metadata from each of the plurality of enterprise systems, wherein the user interface metadata acquired from an enterprise system corresponds to enterprise data in the same enterprise system and describes how the enterprise data should be presented on a user interface of the enterprise system, wherein the enterprise data of each of the plurality of enterprise systems comprises one or more data elements;
in response to acquiring the user interface metadata for each of the plurality of enterprise systems, generate, for display on each of the plurality of enterprise systems, a user interface presentation according to each corresponding user interface metadata;
acquire a structure metadata for each of the plurality of enterprise systems, wherein the structure metadata of an enterprise system describes a structure of the enterprise data of that enterprise system;
generate a data structure presentation for each of the plurality of enterprise systems according to the structure metadata;
establish a first mapping between the user interface presentation and the structure of the enterprise data for each of the plurality of enterprise systems;

establish, for each of the plurality of enterprise systems, a second mapping between the user interface presentation and the data structure presentation;
receive, from an input device of at least one enterprise system, a user input which establishes, on a particular user interface presentation of the at least one enterprise system, a correlation between a first group of data elements from among the plurality of data elements;
establish, based on the received correlation between the first group of data elements on the particular user interface presentation, a correlation between the one or more data elements within a corresponding data structure presentation of the at least one enterprise system according to the second mapping; and
present, on an output device of the at least one enterprise system:
- a first correlation view that depicts the received correlation between the first group of data elements within the particular user interface presentation; and
- a second correlation view that depicts the received correlation between the first group of data elements within the corresponding data structure presentation.

6. The system according to claim 5, wherein the data structure presentation is a tree.

7. The system according to claim 5, wherein the plurality of modules further includes modules that cause the processor to:
receive, from an input device of the at least one enterprise system, a user input which establishes, on a particular data structure presentation of the at least one enterprise system, a correlation between a second group of data elements from among the plurality of data elements; and
establish, based on the received correlation between the second group of data elements, a correlation between the second group of data elements within a corresponding user interface presentation of the at least one enterprise system according to the second mapping.

8. The system according to claim 7, wherein the plurality of modules further includes modules that cause the processor to:
present, on the output device of the at least one enterprise system:
- a third correlation view that depicts the received correlation between the second group of data elements within the particular data structure presentation; and
- a fourth correlation view that depicts the received correlation between the second group of data elements within the corresponding user interface presentation.

9. A computer program product comprising:
a non-transitory computer readable storage device; and
program code stored on said non-transitory computer readable storage device that when executed by a processor of an integrator system, causes said processor to:
acquire, for each of a plurality of enterprise systems that are communicatively coupled to the integrator system, user interface metadata that describes how enterprise data within a corresponding enterprise system should be presented on a user interface of that enterprise system, wherein the enterprise data of each of the plurality of enterprise systems comprises one or more data elements;
in response to acquiring the user interface metadata for each of the plurality of enterprise systems, generate, for display on each of the plurality of enterprise systems, a user interface presentation according to each corresponding user interface metadata;

acquire, for each of the plurality of enterprise systems, a structure metadata that describes a structure of the enterprise data of that enterprise system;

generate, for each of the plurality of enterprise systems, a data structure presentation according to the structure metadata;

establish, for each of the plurality of enterprise systems, a first mapping between the user interface presentation and a structure of the enterprise data;

establish, for each of the plurality of enterprise systems, a second mapping between the user interface presentation and the data structure presentation;

receive, from an input device of at least one enterprise system, a user input which establishes, on a particular user interface presentation of the at least one enterprise system, a correlation between a first group of data elements from among the plurality of data elements; and establish, based on the received correlation between the first group of data elements on the particular user interface presentation, a correlation between the first group of data elements within a corresponding data structure presentation of the at least one enterprise system according to the second mapping; and present, on an output device of the at least one enterprise system:

a first correlation view that depicts the received correlation between the first group of data elements within the particular user interface presentation; and a second correlation view that depicts the received correlation between the first group of data elements within the corresponding data structure presentation.

10. The computer program product of claim 9, wherein the data structure presentation is a tree.

11. The computer program product of claim 9, wherein said program code further comprises program code that causes said processor to:

receive, from an input device of the at least one enterprise system, a user input which establishes, on a particular data structure presentation of the at least one enterprise system, a correlation between a second group of data elements from among the plurality of data elements; and establish, based on the received correlation between the second group of data elements, a correlation between the second group of data elements within a corresponding user interface presentation of the at least one enterprise system according to the second mapping.

12. The computer program product of claim 11, wherein said program code further comprises program code that causes said processor to:

present, on the output device of the at least one enterprise system:

a third correlation view that depicts the received correlation between the second group of data elements within the particular data structure presentation; and a fourth correlation view that depicts the received correlation between the second group of data elements within the corresponding user interface presentation.

* * * * *